United States Patent
Muthulingam et al.

(10) Patent No.: US 9,715,414 B2
(45) Date of Patent: Jul. 25, 2017

(54) SCAN SERVER FOR DUAL-FORMAT DATABASE

(71) Applicant: Oracle International Corporation, Redwood Shores, CA (US)

(72) Inventors: Sujatha Muthulingam, San Ramon, CA (US); Amit Ganesh, San Jose, CA (US); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/922,084

(22) Filed: Oct. 23, 2015

(65) Prior Publication Data
US 2017/0116043 A1    Apr. 27, 2017

(51) Int. Cl.
G06F 9/50      (2006.01)
H04L 29/08    (2006.01)
H04L 29/06    (2006.01)
G06F 17/30    (2006.01)

(52) U.S. Cl.
CPC ...... *G06F 9/5083* (2013.01); *G06F 17/30595* (2013.01); *H04L 67/1008* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2005/0131893 | A1* | 6/2005 | Von Glan | G06F 17/30445 |
| 2008/0065591 | A1* | 3/2008 | Guzenda | G06F 17/30445 |
| 2009/0132541 | A1* | 5/2009 | Barsness | G06F 17/30445 |
| 2016/0179884 | A1* | 6/2016 | Jerzak | G06F 17/30477 707/718 |

OTHER PUBLICATIONS

Oracle White Paper, Parallel Execution with Oracle Database 12c, Dec. 2014, pp. 1-29.*

* cited by examiner

*Primary Examiner* — Syed Roni
(74) *Attorney, Agent, or Firm* — Hickman Palermo Becker Bingham LLP

(57) ABSTRACT

A method, apparatus, and system for a multi-instance database scan server is provided to process data scan operations for segments within in-memory stores, such as in-memory columnar (IMC) stores. The scan server uses a client/server based model, wherein each database instance in the database management system ("DBMS") is associated with a client-side scan server and a server-side scan server. The client-side scan server can reside in the data and/or index layer of the DBMS, receiving requests for scan operations on in-memory segments. After receiving a data scan request from an IMC client, the client-side scan server can create several independently executable scanning tasks to process the request. The scanning tasks are each assigned to a particular server-side scan server for processing based on one or more factors, which may include a load balancing component. Additional factors to be considered may include instance affinity and/or NUMA (Non-Uniform Memory Access) affinity.

17 Claims, 4 Drawing Sheets

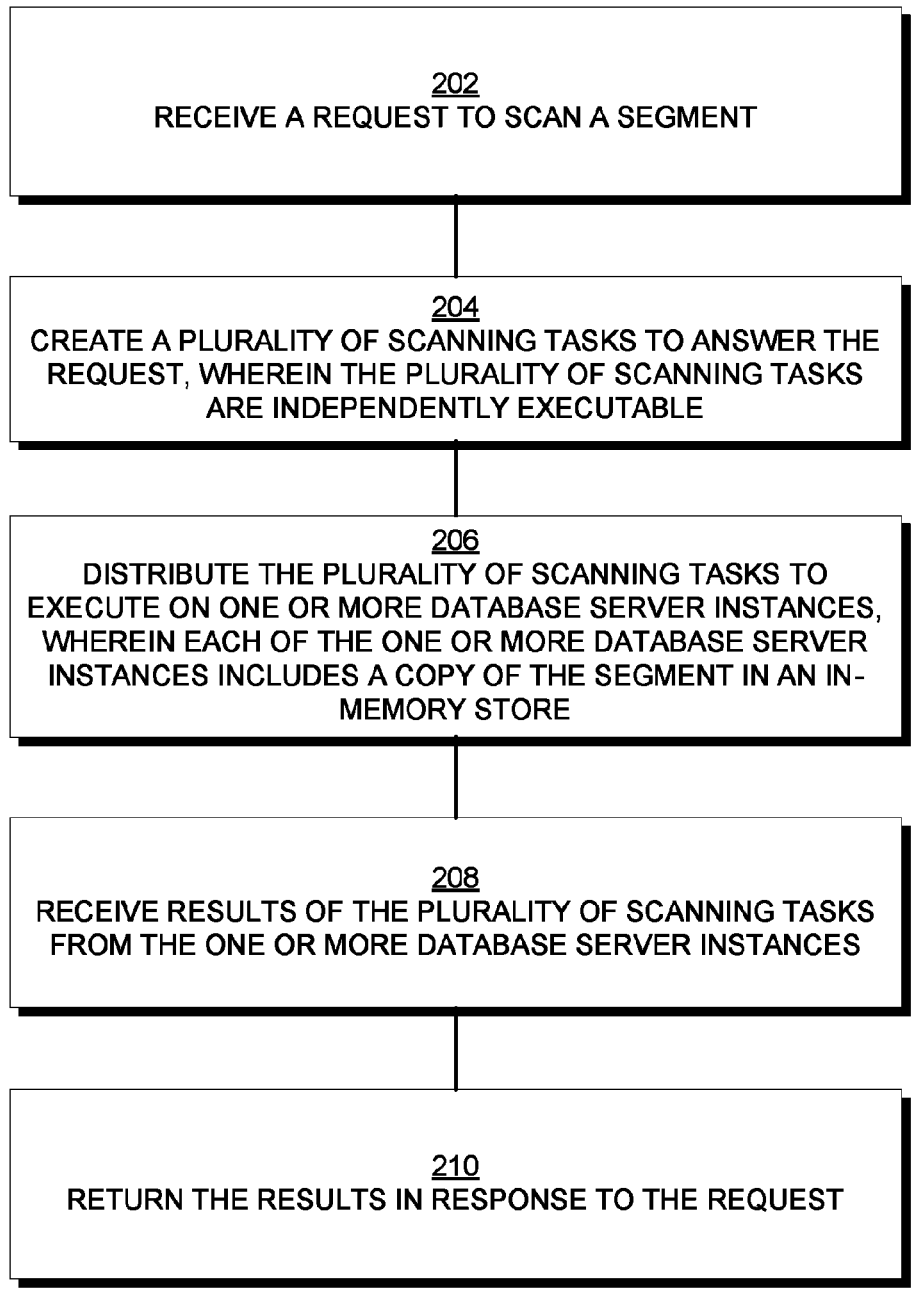

SCAN SERVER FOR DUAL-FORMAT DATABASE

FIELD OF THE INVENTION

The present disclosure relates to databases, and more specifically, to a scan server for a dual-format database.

BACKGROUND

When a database server instance receives a database query from a database client, the database server instance creates a query execution plan to answer the database query. Frequently, the query execution plan will require one or more scan operations, such as table scan operations, to read rows from a specified table in a SQL SELECT or JOIN statement. Other examples of data scan operations include index scans and transaction journal scans.

To accelerate scan performance, a database system may store frequently accessed data in a buffer cache. During execution of an execution plan that requires a data scan, dedicated parallel query slaves can be used to scan the cached data. However, this approach can lead to inefficient use of processing resources, particularly when the database system is a multi-node, multi-instance database. Since the dedicated query slaves are only allocated at the database instance where the corresponding database query is initiated, optimal load balancing of the data scan operations over multiple database instances may be difficult to achieve. Additionally, the dedicated query slaves reserve and block processing resources that may be better directed to servicing other database queries that become more important or higher priority over time.

In multi-node database systems, a table scan operation may be distributed among different nodes when the table is partitioned. Specifically, the task of scanning the entire table may be split into task for scanning the individual partitions. Each partition-scan operation may be assigned to a distinct node, so long as the assigned node has access to the disk on which its assigned partition resides. Techniques for assigning partitions to distinct nodes, and distributing work accordingly, are described for example in U.S. Pat. No. 6,711,571. While such techniques make use of more of the resources available in a multi-node system, each node still has to read from disk the data from its assigned partition. Disk reads are significantly slower than accessing the data from volatile memory.

In dual-format database systems, optimizing scan operations can become even more complicated. Dual-format database systems typically include copies of all data items in a database in one format, and copies of a subset of the data items of the database in another format. For example, U.S. patent application Ser. No. 14/337,179, which is incorporated herein by reference, describes a system in which copies of all data items are stored in row-major tables, and copies of a subset of the data items are also stored in column-major in-memory compression units (IMCUs).

Such in-memory compression units can be employed to provide a dramatic performance boost for many database workloads. For example, in a system that stores heavily-read data items in an in-memory column-major (IMC) store, during query execution, those data items may be retrieved directly from the IMC store rather than from the row-major store, resulting in faster retrieval operations. Optimizing scans in multi-instance dual-format systems is particularly complicated by the fact that any given data item may reside in an IMC store, in buffer cache, and on disk. Further, when in an IMC store, the IMC store may be on a different node than the node that is running the database server instance that receives the query that requires the scans.

Based on the foregoing, there is a need for an efficient way to service data scan operations for dual-format or in-memory databases, particularly for multi-instance in-memory databases.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that depicts a process for an in-memory database management system to utilize a scan server, according to an embodiment;

DETAILED DESCRIPTION

Figure 1A:
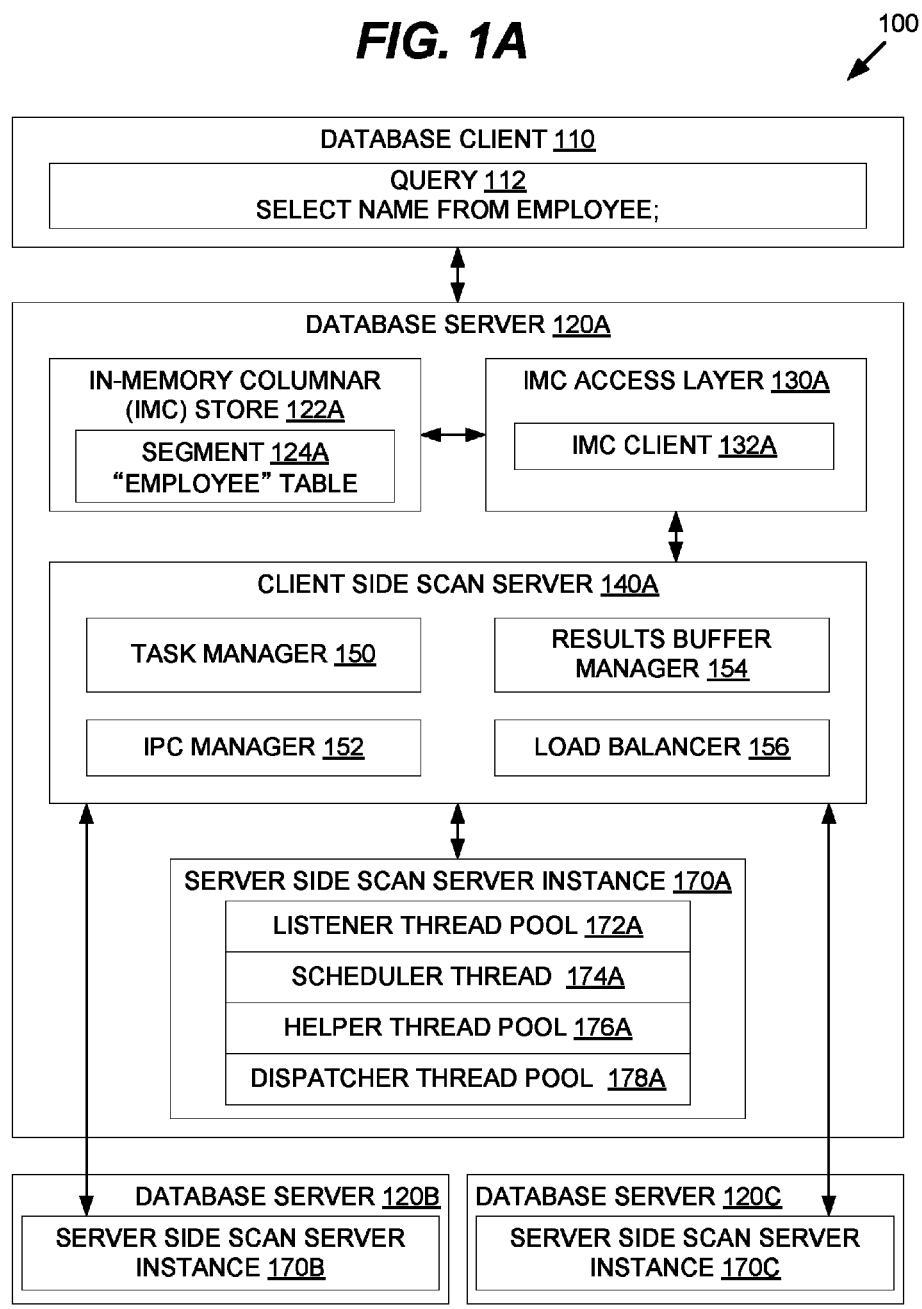
FIG. 1A is a block diagram that depicts an example in-memory database management system using a scan server, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for using a scan server to process data scan operations in a multi-instance database management system ("DBMS"). According to one embodiment, the scan server is a connectionless, stateless, parallel query server. The scan server allows the in-memory data to be materialized in any node of a multi-node cluster, not just the node on which the database instance that is initiating the query resides. The scan server divides the scan task into multiple independently executable fragments and tries to have the multi-node system execute those fragments in parallel. Due to the service being connectionless, the scan server can service multiple clients at the same time, thereby maximizing processor resource utilization.

In one embodiment, the scan server uses a client/server based model, wherein each database instance in the DBMS is associated with a client-side scan server and a server-side scan server. In some embodiments, the client-side and server-side scan servers are local to each associated database instance; in other embodiments, the client-side and/or server-side scan servers may reside on separate servers. The client-side scan server can reside in the data and/or index layer of the DBMS, receiving requests for scan operations by an IMC client residing in an IMC access layer. The scan operations may concern in-memory segments that include, but are not limited to, tables, table partitions, indexes, and transaction logs.

After receiving a data scan request from an IMC client, the client-side scan server can create several independently executable scanning tasks to process the request. However, rather than passing these scanning tasks to dedicated query slaves on the same database instance, the scanning tasks are instead each assigned to a particular server-side scan server for processing. The division of the request into scanning tasks is based on one or more factors, which may include a load balancing component of the client-side scan server that maintains in-memory data distribution maps and resource loading statistics for each database instance in the DBMS. Additional factors to be considered may include instance affinity and/or NUMA (Non-Uniform Memory Access) affinity that may be assigned to requests from an IMC client. In this manner, the data scan workload can be efficiently load balanced across all available database instances and not just the initial database instance where the data scan request originates.

According to an embodiment, communications between client-side scan server processes and server-side scan server processes proceeds transparently using an inter-process communication (IPC) manager on the client-side and listener threads on the server-side. The IPC manager may handle the fragmenting of tasks into smaller blocks according to the requirements of a selected transmission protocol, such as User Datagram Protocol (UDP). When a client-side scan server process and a server-side scan server process need to communicate on the same database instance, then the IPC manager may be bypassed for higher performance.

On the server-side scan server, a pool of listener threads receives and reassembles the task fragments into newly allocated task metadata structures. A scheduler thread then queues these task metadata structures for execution by available helper threads in a pool. Once a helper thread completes a task, then the task may be forwarded to a pool of dispatcher threads to return populated result buffers that respond to the original data scan request. The threads in each of the pools can be created and destroyed on demand according to available resources, and a default minimum number of threads may be defined to provide a baseline processing capacity.

If a low resource condition or error condition is encountered by any of the threads, then the result buffers may instead indicate a failure or diagnostic code, and the data scan request may be resubmitted or processed using alternative methods. Note that since tasks can be aborted in response to low resource conditions and the number of threads can be adjusted in each pool, the server-side scan server can dynamically adjust resource allocation to service other database queries or processes with a higher priority.

The techniques described herein for a scan server for in-memory databases provide several technical advantages. First, load balancing across multiple database instances is more readily attained compared to using dedicated query slaves only on the database instance where a database query is received. For example, the client-side scan server can utilize a load balancer component to divide and distribute scanning tasks across one or more server-side scan server instances. The load balancer component may maintain and utilize in-memory data mappings and loading statistics for each database instance of the DBMS.

Second, by configuring the IPC manager to use stateless and connectionless transmission protocols such as UDP and by configuring the client-side scan servers to be stateless with regards to tasks running on the server-side scan servers, inter-process communication overhead between the client-side and server-side scan servers can be largely eliminated, enabling extreme scalability of the server-side scan server. As a result, the server-side scan server can service thousands or more clients concurrently to provide scaling for very large multi-node database systems. Further, the IPC manager may be bypassed entirely when inter-process communication occurs between processes on a local instance, further reducing overhead.

Third, because the server-side scan server uses a scheduler thread that can create and destroy helper threads according to resource availability, the scan server can flexibly adjust to changing resource levels over time. Additionally, scanning tasks can be failed in response to low resource conditions, enabling dynamic adjustment of computational resources, for example to favor higher priority scan workloads or database instance threads. As a result, computational resources can be more flexibly assigned compared to dedicated query slaves that can only service a single database query until completion. Robust error handling allows failed scanning tasks to be resubmitted or processed using alternative methods, allowing the DBMS to gracefully recover from task failure conditions.

Finally, the scan server can be flexibly deployed to any multi-node in-memory DBMS, regardless of the in-memory data duplication or distribution method that is utilized. Since the load balancer component can maintain a mapping of the in-memory area for each database instance, scanning tasks can be routed to only those database instances that have in-memory copies of the segments to be scanned.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts a database management system 100, according to one embodiment. Database management system 100 of FIG. 1A includes database client 110 and three database servers: database server 120A, database server 120B, and database server 120C.

FIG. 1A also depicts various components internal to database server 120A. With respect to those internal components, database server 120A includes in-memory columnar (IMC) store 122A, IMC access layer 130A, client-side scan server 140A, and server-side scan server instance 170A. IMC store 122A includes segment 124A. IMC access layer 130A includes IMC client 132A.

In FIG. 1A, database server 120B is depicted as only having a server-side scan server instance 170B, and database server 120C is depicted as only having a server-side scan server instance 170C. However, according to one embodiment, database servers 120B and 120C have similar components to database server 120A, though those internal components of database servers 120B and 120C are not shown in FIG. 1A. Thus, each database server 120A-120C in FIG. 1A may host one client-side scan server and one server-side scan server. Moreover, the processes executing in server-side scan server instances 170B and 170C may be similar to the processes shown for server-side scan server instance 170A.

In-Memory Access Layer Overview

In the embodiment illustrated in FIG. 1A, database server 120A includes an in-memory columnar (IMC) access layer 130A. Access layer 130A generally represents the interface by which components interact with IMC store 122A. IMC access layer 130A includes IMC client 132A. For other components to interact with IMC store 122A, IMC client 132A may be registered as a service in DBMS 100. The registration operation may be performed using whatever service registration mechanism is supported by DBMS 100, such as, for example by using a compile time service definition. IMC client 132A comprises metadata and functions that may be called by client-side scan server 140A or server-side scan server instances 170A-170C.

Client-Side Scan Server Overview

As shown in FIG. 1A, IMC client 132A is in communication with client-side scan server 140A, which in turn may communicate with each of server-side scan server instances 170A, 170B, and 170C. According to one embodiment, client-side scan server 140A exposes a set of APIs. Those APIs provide an abstraction layer over inter-process communication (IPC) between scan row source requests from IMC client 132A, and background processes, or the processes executing on server-side scan server instances 170A-170C.

Since client-side scan server 140A and server-side scan server instance 170A are on the same local database instance, a shared memory area can be used for inter-process communication. On the other hand, since server-side scan server instances 170B and 170C are located on remote database instances, client-side scan server 140A may use IPC manager 152 for inter-process communication between server-side scan server instances 170B and 170C.

In the illustrated embodiment, client-side scan server 140A includes task manager 150, IPC manager 152, results buffer manager 154 and load balancer 156. Task manager 150 may receive, from IMC client 132A, a scan or fetch row source request, which task manager 150 then divides into smaller, independently executable scanning tasks. Task manager 150 may utilize load balancer 156 to determine how to divide the request into smaller scanning tasks. IPC manager 152 may then be utilized as necessary to distribute the scanning tasks to one or more server-side scan server instances 170A-170C. Results buffer manager 154 listens for completed result buffers dispatched from server-side scan server instances 170A-170C, which are then returned to answer the original request from IMC client 132A. If any failures are indicated in the result buffers, then IMC client 132A may resubmit the request or use an alternative method of scanning.

Server-Side Scan Server Overview

As shown in FIG. 1A, each database server 120A-120C hosts a respective server-side scan server instance 170A-170C. Four example background processes are shown to be executing on server-side scan server instance 170A. Listener thread pool 172A listens for incoming communications from IPC manager 152 to populate new in-memory metadata structures that represent the scanning tasks. Scheduler thread 174A then queues the in-memory metadata structures for execution by available threads in helper thread pool 176A. Helper thread pool 176A actually carries out the scanning operations on the in-memory segments, for example segment 124A in IMC store 122A. In certain embodiments, helper thread pool 176A may directly access IMC store 122A instead of using IMC access layer 130A. Finally, dispatcher thread pool 178A receives completed results buffers from helper thread pool 176A, which are then forwarded back to results buffer manager 154 of client-side scan server 140A. Threads in each of the process pools may be created and destroyed as necessary according to load and available resources.

If an error condition occurs in any of the server-side processes, then an error or diagnostic code may be placed in a result buffer for dispatching by dispatcher thread pool 178A. Additionally, any scanning tasks associated with the request that is encountering an error may be canceled. For example, if listener thread pool 172A is unable to allocate memory for an in-memory metadata structure, then an out-of-memory error may be indicated in the result buffer. Similarly, if scheduler thread 174A is unable to find free helper threads or create new helper threads due to high processor load, then a low resource error may be indicated in the result buffer. If a helper thread in helper thread pool 176A is unable to complete its assigned task, then an associated error may be indicated in the result buffer.

Data Flow Overview

Figure 1B:
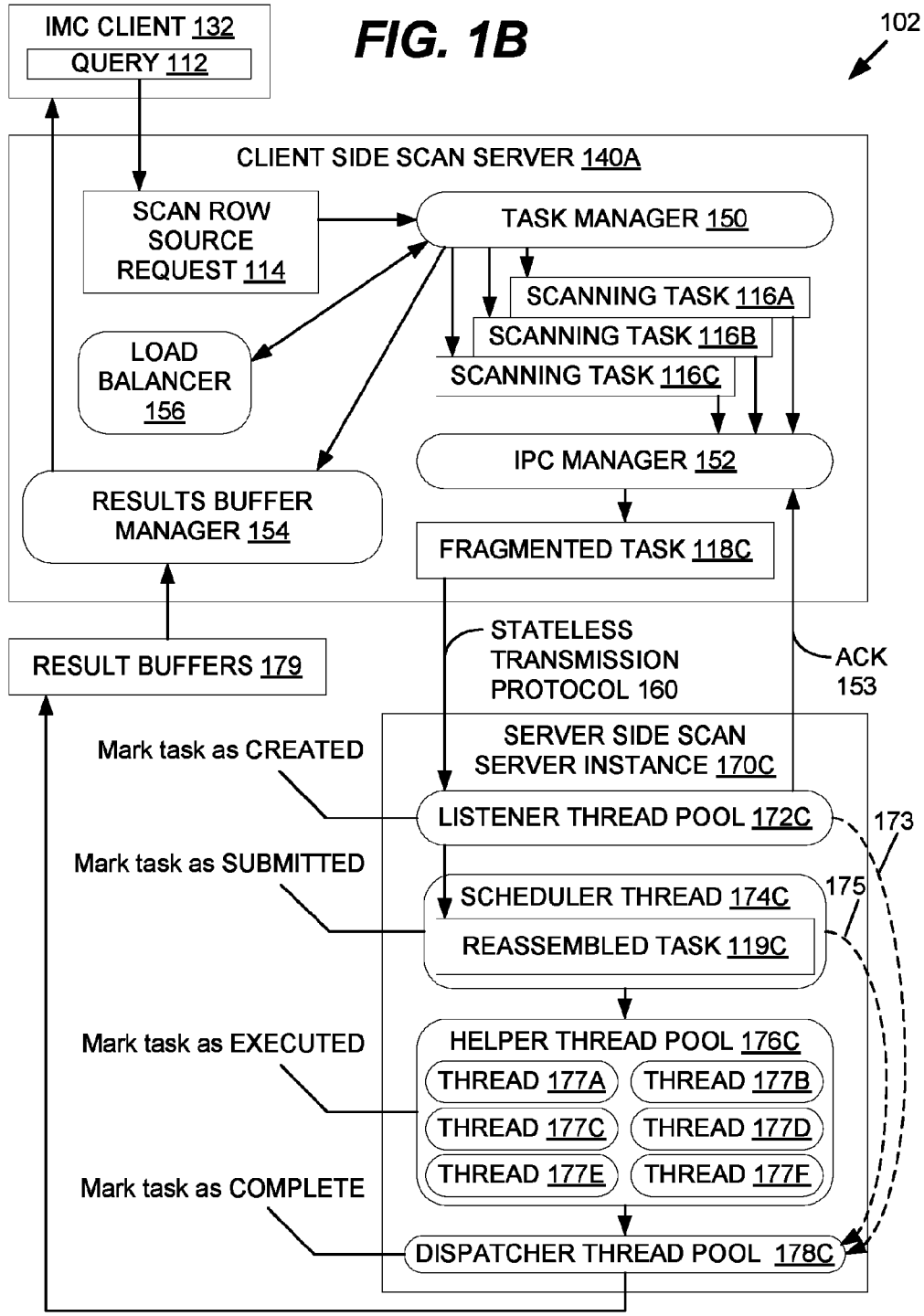
FIG. 1B is a block diagram that depicts an example data flow through a scan server for an in-memory database, according to an embodiment.

With an overview of a DBMS 100 with a scan server now established, it may be instructive to examine the flow of data within DBMS 100 in greater detail. Accordingly, FIG. 1B is a block diagram that depicts an example data flow through a scan server for an in-memory database, according to an embodiment. Diagram 102 of FIG. 1B includes IMC client 132, client-side scan server 140A, acknowledgement 153, stateless transmission protocol 160, server-side scan server instance 170C, out of memory error 173, out of resource error 175, and result buffers 179. IMC client 132 includes query 112. Client-side scan server 140A includes scan row source request 114, fragmented task 118C, scanning task 116A, scanning task 116B, scanning task 116C, task manager 150, IPC manager 152, results buffer manager 154, and load balancer 156. Server-side scan server instance 170C includes listener thread pool 172C, scheduler thread 174C, helper thread pool 176C, and dispatcher thread pool 178C. Scheduler thread 174C includes reassembled task 119C. Helper thread pool 176C includes thread 177A, thread 177B, thread 177C, thread 177D, thread 177E, and thread 177F. With respect to FIG. 1B, like numbered elements may correspond to the same elements from FIG. 1A.

As shown in FIG. 1B, the data flow begins when IMC client 132 receives query 112. Using the example query 112 shown in FIG. 1A, or "SELECT NAME FROM EMPLOYEE;", IMC client 132 may determine that the execution plan for query 112 includes a scan for the "EMPLOYEE" table, or segment 124A in IMC store 122A. Accordingly, IMC client 132 generates scan row source request 114, which corresponds to a scan on segment 124A. IMC client 132 sends scan row source request 114 to the scan server for processing, or more specifically to client-side scan server 140A. Note that while only a single scan row source request 114 is sent, IMC client 132 may also generate multiple scan row source requests depending on the scan requirements of query 112. For example, a query with a table join may require two or more scan row source requests.

The data flow continues with IMC client 132 communicating with client-side scan server 140A, which in turn communicates with server-side scan server instance 170C. Client-side scan server 140A divides scan row source request 114 into independently executable scanning tasks 116A-116C, which are then distributed to one or more server-side scan server instances 170A-170C for execution. After the scan operations are complete, then the results are returned within result buffers 179, which are forwarded back to IMC client 132 via results buffer manager 154. When result buffers 179 indicates an error condition, then IMC client 132 may retry scan row source request 114 at a later time or use an alternative scanning method.

Process Overview

To provide a structured framework to describe the elements of FIG. 1B in greater detail, it may be helpful to follow a typical in-memory segment scanning process using a scan server. Accordingly, referring to FIG. 2, FIG. 2 is a flow diagram that depicts a process for an in-memory database management system to utilize a scan server, according to an embodiment.

Receiving a Request to Scan a Segment

At block 202 of process 200, referring to FIG. 1A and FIG. 1B, task manager 150 of database server 120A receives scan row source request 114 to scan segment 124A. Each scan row source request 114 may be initialized with a unique client identifier and a service state object for status querying and error handling. While the example shown in FIG. 1A is specifically for an in-memory database table, segment 124A could also be an index or a transaction journal. Scan row source request 114 may originate from IMC client 132A, which may reside in a data or index layer of DBMS 100. After database server 120A receives query 112 from database client 110 and generates a corresponding execution plan, IMC client 132A may determine whether one or more operators in the execution plan are scan operators for in-memory segments within IMC store 122A. If so, then IMC client 132A may generate and send corresponding scan row source requests, which are then received by task manager 150 of client-side scan server 140A in block 202.

Creating Smaller Independently Executable Scanning Tasks

At block 204 of process 200, referring to FIG. 1A and FIG. 1B, task manager 150 of database server 120A creates scanning tasks 116A-116C to answer scan row source request 114, wherein scanning tasks 116A-116C are independently executable. For example, scanning tasks 116A-116C may each be directed to independent non-overlapping scan ranges, wherein scanning task 116A is directed towards primary key indexes 0 to 999 of segment 124A, scanning task 116B is directed towards primary key indexes 1000 to 1999 of segment 124A, and scanning task 116C is directed towards primary key indexes 2000 to 2999 of segment 124A.

The above equal division of the data ranges is simplistic and assumes that each scanning task can be completed in approximately equal time. To provide finer grained load balancing, task manager 150 may consult with load balancer 156 to determine the loading statistics for each database instance as well as the in-memory data ranges for each database instance. In this manner, appropriate scanning tasks can be created to automatically optimize load balancing across the available database instances. In some embodiments, task manager 150 may only select a single database instance to execute all of the scanning tasks.

Automatic Load Balancer Across Database Instances

To determine a number of scanning tasks to create and a data range size for each of the scanning tasks, task manager 150 may utilize at least the following information, retrieved from load balancer 156 for each server-side scan server instance 170A-170C:

Available memory (avoid sending work to instances with low memory)

Depth of task queues for the scheduler thread (preferably maintain uniform task queue depth across database instances)

Executing task priority levels in the helper thread pool (avoid work starvation by avoiding instances that are processing higher priority tasks—for example each task may be assigned a default priority that reduces with resource consumption)

Dispatcher drain rate for the dispatcher thread pool (avoid loading instances that are busy processing and returning results)

A user-configurable maximum number of helper threads per client (avoid overloading a database instance with work from a single IMC client)

A number of active threads available in the helper thread pool (send work to instances that have spare processing capacity)

For example, if the statistics from load balancer 156 indicate that server-side scan server instance 170A is under very heavy load, server-side scan server instance 170B is under medium load, and server-side scan server instance 170C is under light load, then task manager 150 may create a scanning task 116A for server-side scan server instance 170A directed towards primary key indexes 0 to 299, a scanning task 116B for server-side scan server instance 170B directed towards primary key indexes 300 to 1299, and a scanning task 116C for server-side scan server instance 170C directed towards primary key indexes 1300 to 2999. In this manner, each of the scanning tasks 116A-116C can be estimated to finish at approximately the same time according to the loading levels of each database instance.

The above examples assume that each of the database instances includes an in-memory copy of segment 124A. However, depending on the specific multi-instance data distribution model utilized by DBMS 100, this may not necessarily be the case. Accordingly, load balancer 156 may also include a segment mapping that indicates, for each database instance, the specific segments and/or row ranges that are stored in-memory. For example, if load balancer 156 indicates that an in-memory copy of segment 124A is only available at database server 120A and database server 120B, then task manager 150 may only create two (2) scanning tasks for server-side scan server instances 170A and 170B.

Load Balancer Overrides

Besides the default automatic load balancing described above, load balancer 156 may also be modified by various overrides. For example, the database administrator may define, on a per-segment or other basis, a local instance override for IMC client 132A. This override may force all scanning tasks to be created for the local database instance on the specified segment or other database object, even if the segment or other database object is also available in-memory on a remote database instance. In some circumstances, this local instance override may provide improved performance by reducing inter-process communication overhead.

Similarly, an instance affinity override may be specified for IMC client 132A. For example, depending on the multi-instance data distribution model used for DBMS 100, some segments may only be stored in-memory on a single database instance. In this case, an instance affinity may be defined for those segments according to the database instance that contains those segments in-memory, and the scanning tasks for those segments will be directed according to the defined instance affinity.

NUMA affinity overrides may also be defined, for example if a particular database instance has faster in-memory access to a particular segment compared to other database instances. NUMA affinity may also be defined at the processor core level for use by the scheduler thread of each server-side scan server instance.

Result Buffer Preallocation

Before distributing the scanning tasks, task manager 150 may direct results buffer manager 154 to pre-allocate result buffers 179 to receive the eventual results of the scanning tasks. Based on knowledge of a defined schema for segment 124A and the row ranges for scanning tasks 116A-116C, an estimated buffer size large enough to contain the results can be pre-allocated within result buffers 179. If such estimation is not feasible or would require too many computational resources, then a default minimum buffer size may be utilized, which may be extended as necessary if the actual results require more memory. Results buffer manager 154 may therefore define memory addresses and data sizes for result buffers 179.

Distributing the Scanning Tasks

At block 206 of process 200, referring to FIG. 1A and FIG. 1B, IPC manager 152 of database server 120A distributes scanning tasks 116A-116C to execute on one or more database server instances, or server-side scan server instances 170A-170C, wherein each of server-side scan server instances 170A-170C includes a copy of segment 124A in an in-memory store. As discussed above, for inter-process communication between processes on a local instance, IPC manager 152 may be bypassed and a shared memory area may be utilized instead. Thus, client-side scan server 140A and server-side scan server instance 170A may communicate directly using a shared memory area of database server 120A. However, for inter-process communication between a local process and a remote process, IPC manager 152 may be utilized.

FIG. 1B illustrates an example where IPC manager 152 is utilized for communications between client-side scan server 140A and server-side scan server instance 170C. Thus, as shown in FIG. 1B, IPC manager 152 breaks up scanning task 116C into fragmented task 118C for sending to server-side scan server instance 170C by stateless transmission protocol 160. For example, if stateless transmission protocol 160 is UDP, then fragmented task 118C may correspond to UDP packets for scanning task 116C. IPC manager 152 may transparently handle the tasks of opening and closing communication ports and formatting and splitting data packets according to the requirements of stateless transmission protocol 160. Port mappings may also be shared with remote instances for use by corresponding remote IPC managers.

Server-Side Scan Server Processing

Shifting focus to the server-side, server-side scan server instance 170C begins by receiving fragmented task 118C. One or more threads of listener thread pool 172 receive fragmented task 118C, allocating memory as needed. If an out-of-memory condition is encountered, then listener thread pool 172C may abort the processing of fragmented task 118C, sending an out of memory error 173 to dispatcher thread pool 178C. This error may be indicated as an error or diagnostic code stored in a result packet. Once fragmented task 118C is successfully received, an acknowledgement 153 is returned and scanning task 116C is marked as "CREATED". Each scanning task 116A-116C may maintain a state that can be queried by any of the client-side scan servers or the IMC client, for example to implement a task timeout.

Scheduler thread 174C then receives the reassembled task 119C, which was reassembled as an in-memory metadata structure by listener thread pool 172C. Scheduler thread 174C may add reassembled task 119C into a queue of tasks to be executed, and then mark scanning task 116C as "SUBMITTED". Once reassembled task 119C is encountered in the queue, then scheduler thread 174C may assign reassembled task 119C to a specific thread of helper thread pool 176C. Scheduler thread 174C may also create and destroy threads within helper thread pool 176C according to the processor load and memory capacity of the corresponding database instance. If no threads are available and the queue is already very long, then an out of resource error 175 may be sent to dispatcher thread pool 178C.

Helper thread pool 176C includes threads 177A-177F that performs the data scan operation on the in-memory segment, or segment 124A. Each thread 177A-177F may execute on a separate logical or physical processor core. For example, assuming that scheduler thread 174A assigns reassembled task 119C to thread 177A, thread 177A may proceed to scan the rows with primary key indexes 1300 to 2999 of the "EMPLOYEE" table stored in segment 127A of an IMC store in database server 120C. Once all of the rows are scanned, then scanning task 116C may be marked as "EXECUTED".

Dispatcher thread pool 178C includes dispatcher threads that receive the results from helper thread pool 176C for distribution back to the client-side. As such, dispatcher thread pool 178C will place the results into pre-allocated result buffers 179. While not specifically shown in FIG. 1B, IPC manager 152 may be utilized to communicate the result buffers 179 back to client-side scan server 140A. Once dispatched, scanning task 116C may be marked as "COMPLETED".

The process illustrated in FIG. 1B between client-side scan server 140A and server-side scan server instance 170C may also be carried out in a similar manner for server-side scan server instance 170B. For server-side scan server instance 170A, a similar process may be carried out with the exception that a shared memory area is utilized for inter-process communication rather than IPC manager 152.

Reaping the Results

At block 208 of process 200, referring to FIG. 1A and FIG. 1B, results buffer manager 154 receives result buffers 179 from server-side scan server instances 170A-170C. Results buffer manager 154 receives results from all of the database instances, allocating additional memory as necessary if the pre-allocated memory size is insufficient.

Returning the Results

At block 210 of process 200, referring to FIG. 1A and FIG. 1B, results buffer manager 154 returns result buffers 179 to IMC client 132A in response to scan row source request 114. If result buffers 179 indicate an error condition, then IMC client 132 may retry the scan row source request 114 at a later time or use an alternative scanning method. Additionally, IMC client 132 can initiate a periodic status check on scan row source request 114. In turn, task manager 150 may initiate a periodic status check on scanning tasks 116A-116C to determine the progress of scanning tasks 116A-116C as they progress from CREATED to SUBMITTED to EXECUTED and then COMPLETE. Thus, scanning tasks 116A-116C may be resubmitted in response to a timeout.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
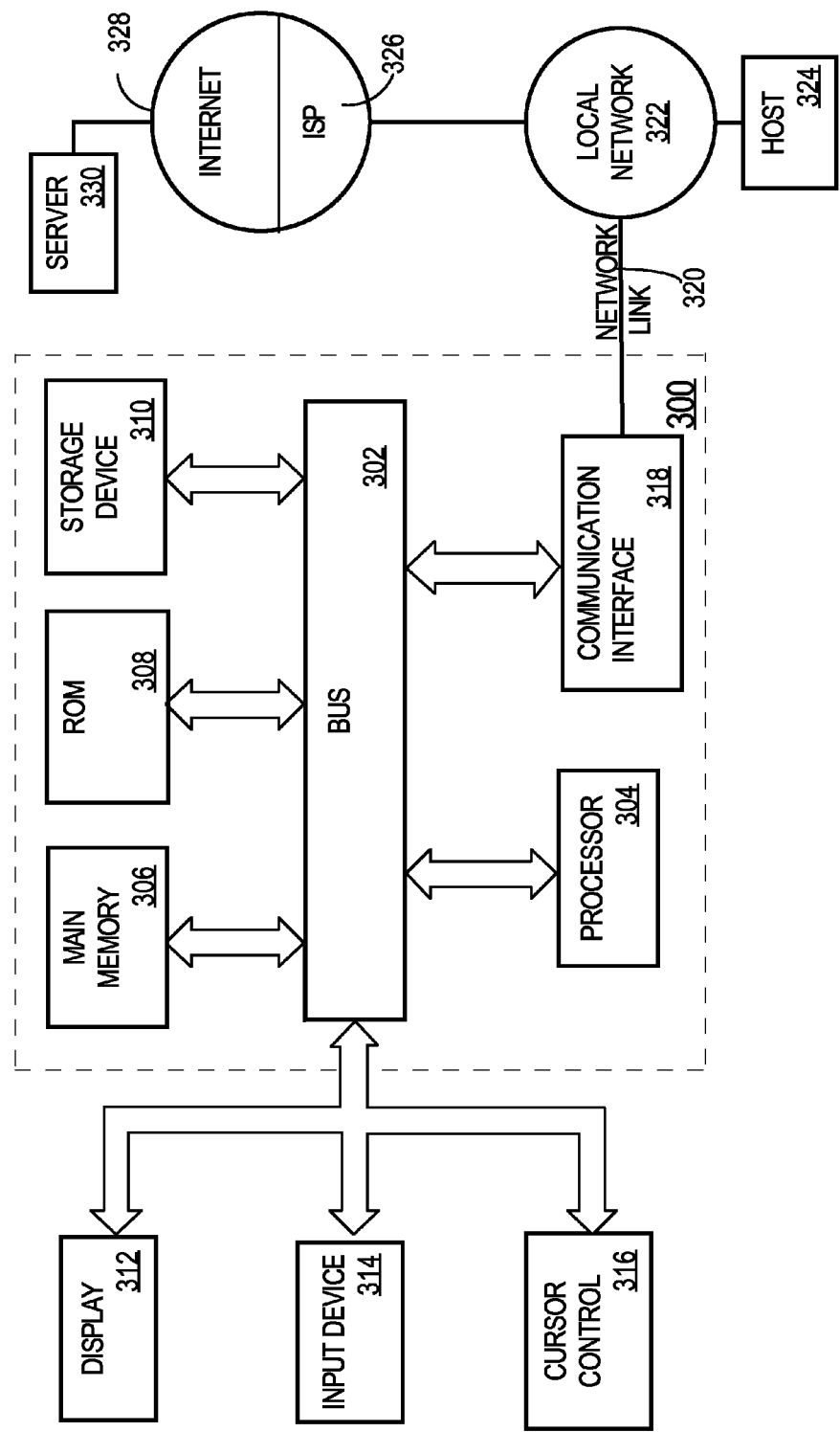
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    executing a plurality of database servers, wherein each database server of the plurality of database servers has access to a particular database object;
    executing a plurality of server-side scan servers, wherein each server-side scan server executes on a respective database server of the plurality of database servers;
    receiving, by a client-side scan server that is executing on a particular database server, a request to scan a segment of the particular database object;
    wherein the plurality of server-side scan servers includes a first subset and a second subset;
    wherein each server-side scan server in the first subset has access to a copy of the segment in an in-memory store;
    wherein each server-side scan server in the second subset does not have access to a copy of the segment in an in-memory store;
    creating, by the client-side scan server, a plurality of scanning tasks to answer the request, wherein the plurality of scanning tasks are independently executable;
    wherein creating the plurality of scanning tasks includes creating the plurality of scanning tasks such that each scanning task is associated with a scan range that does not overlap with the scan range of any other of the plurality of scanning tasks;
    identifying, by the client-side scan server, one or more server-side scan servers that belong to the first subset;
    determining assignments, by the client-side scan server, that assign each of the plurality of scanning tasks to a corresponding server-side scan server of the one or more server-side scan servers;
    distributing, by the client-side scan server, the plurality of scanning tasks to the one or more server-side scan servers based on the assignments, to cause each scan range to be scanned by only the server-side scan server that is assigned the scanning task associated with the scan range;
    receiving, at the client-side scan server, results of the plurality of scanning tasks from the one or more server-side scan servers;
    returning, by the client-side scan server, the results in response to the request; and
    wherein the method is performed by one or more computing devices.

2. The method of claim 1, wherein the segment is one of a table, a table partition, an index, and a transaction log.

3. The method of claim 1, wherein each of the one or more server-side scan servers has access to a copy of the segment in a respective in-memory columnar (IMC) store.

4. The method of claim 1, wherein the client-side scan server is associated with a load balancer, and the step of determining assignments is performed based, at least in part, on load balancing factors determined by the load balancer.

5. The method of claim 4, further comprising:
    the load balancer performing load balancing, among the one or more server-side scan servers, based on information about each of the one or more server-side scan servers;
    wherein, for each of the one or more server-side scan servers, the information used by the load balancer includes at least one of:
    available memory;
    task queue depth;
    executing task priority;
    dispatcher drain rate;
    maximum threads per client; and
    a number of active threads available.

6. The method of claim 1, wherein the distributing of the plurality of scanning tasks to the one or more server-side scan servers is based, at least in part, on an instance affinity or a non-uniform memory access (NUMA) affinity defined for the request.

7. One or more non-transitory computer-readable media storing instructions, wherein the instructions include instructions which, when executed by one or more hardware processors, cause:
    executing a plurality of database servers, wherein each database server of the plurality of database servers has access to a particular database object;
    executing a plurality of server-side scan servers, wherein each server-side scan server executes on a respective database server of the plurality of database servers;
    receiving, by a client-side scan server that is executing on a particular database server, a request to scan a segment of the particular database object;
    wherein the plurality of server-side scan servers includes a first subset and a second subset;
    wherein each server-side scan server in the first subset has access to a copy of the segment in an in-memory store;
    wherein each server-side scan server in the second subset does not have access to a copy of the segment in an in-memory store;

creating, by the client-side scan server, a plurality of scanning tasks to answer the request, wherein the plurality of scanning tasks are independently executable;

wherein creating the plurality of scanning tasks includes creating the plurality of scanning tasks such that each scanning task is associated with a scan range that does not overlap with the scan range of any other of the plurality of scanning tasks;

identifying, by the client-side scan server, one or more server-side scan servers that belong to the first subset;

determining assignments, by the client-side scan server, that assign each of the plurality of scanning tasks to a corresponding server-side scan server of the one or more server-side scan servers;

distributing, by the client-side scan server, the plurality of scanning tasks to the one or more server-side scan servers based on the assignments, to cause each scan range to be scanned by only the server-side scan server that is assigned the scanning task associated with the scan range;

receiving, at the client-side scan server, results of the plurality of scanning tasks from the one or more server-side scan servers;

returning, by the client-side scan server, the results in response to the request.

8. The one or more non-transitory computer-readable media of claim 7, wherein the segment is one of a table, a table partition, an index, and a transaction log.

9. The one or more non-transitory computer-readable media of claim 7, wherein each of the one or more server-side scan servers has access to a copy of the segment in a respective in-memory columnar (IMC) store.

10. The one or more non-transitory computer-readable media of claim 7, wherein the client-side scan server is associated with a load balancer, and the instructions for determining assignments cause assignments to be determined based, at least in part, on load balancing factors determined by the load balancer.

11. The one or more non-transitory computer-readable media of claim 10, further comprising:
instructions which, when executed by one or more hardware processors, cause the load balancer to perform load balancing, among the one or more server-side scan servers, based on information about each of the one or more server-side scan servers;
wherein, for each of the one or more server-side scan servers, the information used by the load balancer includes at least one of:
available memory;
task queue depth;
executing task priority;
dispatcher drain rate;
maximum threads per client; and
a number of active threads available.

12. The one or more non-transitory computer-readable media of claim 7, wherein the instructions for distributing of the plurality of scanning tasks to the one or more server-side scan servers cause the distributing to be based, at least in part, on an instance affinity or a non-uniform memory access (NUMA) affinity defined for the request.

13. A database management system comprising:
a plurality of computing devices executing a respective plurality of database servers;
wherein each database server of the plurality of database servers has access to a particular database object;
a first computing device executing a client-side scan server;
a plurality of second computing devices, each of which is executing a respective server-side scan server of a plurality of server-side scan servers;
wherein the plurality of server-side scan servers includes a first subset and a second subset;
wherein each server-side scan server in the first subset has access to a copy of the segment in an in-memory store;
wherein each server-side scan server in the second subset does not have access to a copy of the segment in an in-memory store;
wherein the first computing device is operatively coupled, through one or more network connections, to each of the plurality of second computing devices;
wherein the client-side scan server is configured to:
receive a request to scan a segment;
create a plurality of scanning tasks to answer the request, wherein the plurality of scanning tasks are independently executable;
wherein creating the plurality of scanning tasks includes creating the plurality of scanning tasks such that each scanning task is associated with a scan range that does not overlap with the scan range of any other of the plurality of scanning tasks;
identify one or more server-side scan servers that belong to the first subset;
determine assignments that assign each of the plurality of scanning tasks to a corresponding server-side scan server of the one or more server-side scan servers;
distribute the plurality of scanning tasks to the one or more server-side scan servers based on the assignments, to cause each scan range to be scanned by only the server-side scan server that is assigned the scanning task associated with the scan range;
receive results of the plurality of scanning tasks from the one or more server-side scan servers; and
return the results in response to the request.

14. The database management system of claim 13, wherein the segment is one of a table, a table partition, an index, and a transaction log.

15. The database management system of claim 13, wherein each of the one or more server-side scan servers has access to a copy of the segment in a respective in-memory columnar (IMC) store.

16. The database management system of claim 13, wherein the client-side scan server is associated with a load balancer, and the client-side scan server determines assignments based, at least in part, on load balancing factors determined by the load balancer.

17. The database management system of claim 16, wherein:
the load balancer is configured to perform load balancing, among the one or more server-side scan servers, based on information about each of the one or more server-side scan servers;
wherein, for each of the one or more server-side scan servers, the information used by the load balancer includes at least one of:
available memory;
task queue depth;
executing task priority;
dispatcher drain rate;
maximum threads per client; and
a number of active threads available.

* * * * *

UNITED STATES PATENT AND TRADEMARK OFFICE
CERTIFICATE OF CORRECTION

PATENT NO. : 9,715,414 B2
APPLICATION NO. : 14/922084
DATED : July 25, 2017
INVENTOR(S) : Muthulingam et al.

It is certified that error appears in the above-identified patent and that said Letters Patent is hereby corrected as shown below:

In the Specification

In Column 10, Line 22, delete "capacity)" and insert -- capacity). --, therefor.

Signed and Sealed this
Twentieth Day of March, 2018

Andrei Iancu
*Director of the United States Patent and Trademark Office*